United States Patent [19]

Hobbs et al.

[11] 4,204,979
[45] May 27, 1980

[54] METHOD OF PROCESSING ACTIVATED CARBON

[76] Inventors: Jim F. Hobbs, 618 Winchester Dr., Richardson, Tex. 75079; Craig Smyser, 4013 Miramar, Dallas, Tex. 75200

[21] Appl. No.: 808,176

[22] Filed: Jun. 20, 1977

Related U.S. Application Data

[60] Division of Ser. No. 627,651, Oct. 31, 1975, Pat. No. 4,050,900, which is a continuation of Ser. No. 423,398, Dec. 10, 1973, abandoned, which is a continuation of Ser. No. 173,803, Aug. 23, 1971, abandoned, which is a continuation-in-part of Ser. No. 38,936, May 20, 1970, Pat. No. 3,648,630.

[51] Int. Cl.$^2$ .................. C01B 31/10; C01B 31/08; B01J 21/20; B01J 21/18
[52] U.S. Cl. .................. 252/416; 252/411 R; 252/419; 252/421; 252/445
[58] Field of Search ............... 252/421, 445, 420, 416, 252/419, 411 R; 201/32

[56] References Cited

U.S. PATENT DOCUMENTS

| 249,004 | 11/1881 | Chesebrough .................. 252/411 R |
| 755,662 | 3/1904 | Hill . |
| 1,541,099 | 6/1925 | Barneby .................. 252/445 |
| 1,714,245 | 5/1929 | Schaefer . |
| 1,866,417 | 7/1932 | Mackert . |
| 2,010,460 | 8/1935 | McKinley . |
| 2,024,652 | 12/1935 | Martel . |
| 2,032,402 | 3/1936 | Colby . |
| 2,481,504 | 9/1949 | Ferro et al. . |
| 2,593,326 | 4/1952 | McAskill . |
| 2,752,869 | 7/1956 | Keenan . |
| 2,754,779 | 7/1956 | Toepel . |
| 2,855,494 | 9/1958 | Kuebler . |
| 2,879,726 | 3/1959 | Ferriss et al. . |
| 2,905,608 | 9/1959 | Noddings et al. . |
| 2,932,712 | 4/1960 | Levin . |
| 2,932,713 | 4/1960 | Powers . |
| 3,031,982 | 5/1962 | Gordon et al. . |
| 3,064,593 | 11/1962 | Burk et al. . |
| 3,150,619 | 9/1964 | Brucken et al. . |
| 3,200,776 | 8/1965 | Simpson . |
| 3,231,512 | 1/1966 | Harter . |
| 3,251,137 | 5/1966 | Alleman . |
| 3,259,083 | 7/1966 | Evans . |
| 3,272,338 | 9/1966 | Gallagher . |
| 3,312,183 | 4/1967 | Kells et al. . |
| 3,432,397 | 3/1969 | Berg . |
| 3,467,035 | 9/1969 | Anderson et al. . |
| 3,471,020 | 10/1969 | Wallace . |
| 3,491,708 | 1/1970 | Burden, Jr. et al. . |
| 3,510,265 | 5/1970 | Kawahata . |
| 3,515,078 | 6/1970 | Maitilasso . |
| 3,521,581 | 7/1970 | Quensel . |
| 3,648,630 | 3/1972 | Hobbs et al. . |

FOREIGN PATENT DOCUMENTS 213940 5/1924 United Kingdom ..................... 252/421
496942 12/1938 United Kingdom ..................... 252/445

OTHER PUBLICATIONS

Journal Am. Chem. Soc.; vol. 76, (1954) pp. 971–973, Taylor & Wethington.
"Infrared Heating for People & Products" General Electric Publication.

Primary Examiner—P. E. Konopka
Attorney, Agent, or Firm—Richards, Harris & Medlock

[57] ABSTRACT

A method for processing of sewage sludge from wastewater treating plants and the initial activation and regeneration of activated carbon granules or powder used for adsorption in wastewater treatment and the like. The method is carried out by supporting the combustible material in an enclosure, directing infrared radiation on the material, and controlling the atmosphere in the enclosure around the material for purposes of controlling the oxidation process initiated by the heat from the infrared radiation. In a more specific form the method includes a step of counterflowing combustion gases over the combustible material to supplement the infrared heat. The combustion chamber of the enclosure is operated at a slight vacuum to minimize escape of noxious odors. In practicing the method with sewage sludge, the sludge is first pre-dried and fragmented before introducing it into the enclosure. In the enclosure the sludge is burned by the combined heat of the infrared and counterflowing combustion gases to incinerate all combustible material in the sludge. When applied to carbon particles, the method comprises the burning of bonding agents and other foreign matter present in the carbon when the carbon is initially activated, and when the method is applied to regeneration or reactivation of the carbon, the contaminants on and within the carbon resulting from the adsorption process are burned from the carbon with the atmosphere controlled to prevent oxidation of the carbon itself.

9 Claims, 13 Drawing Figures

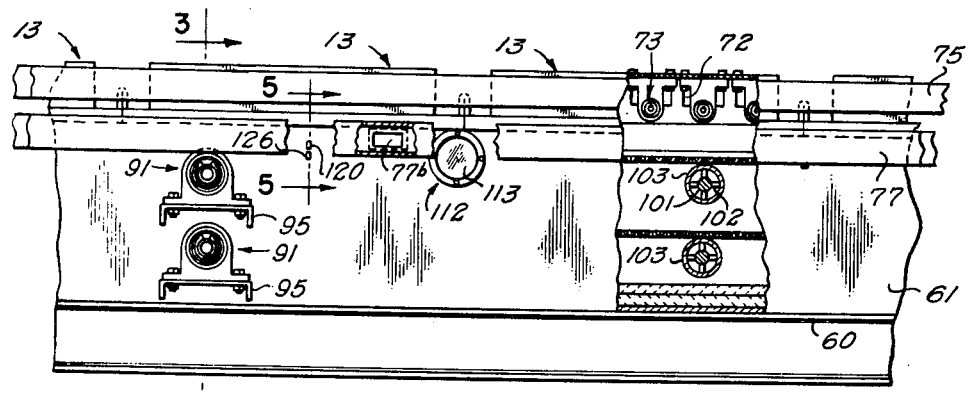
Fig. 2
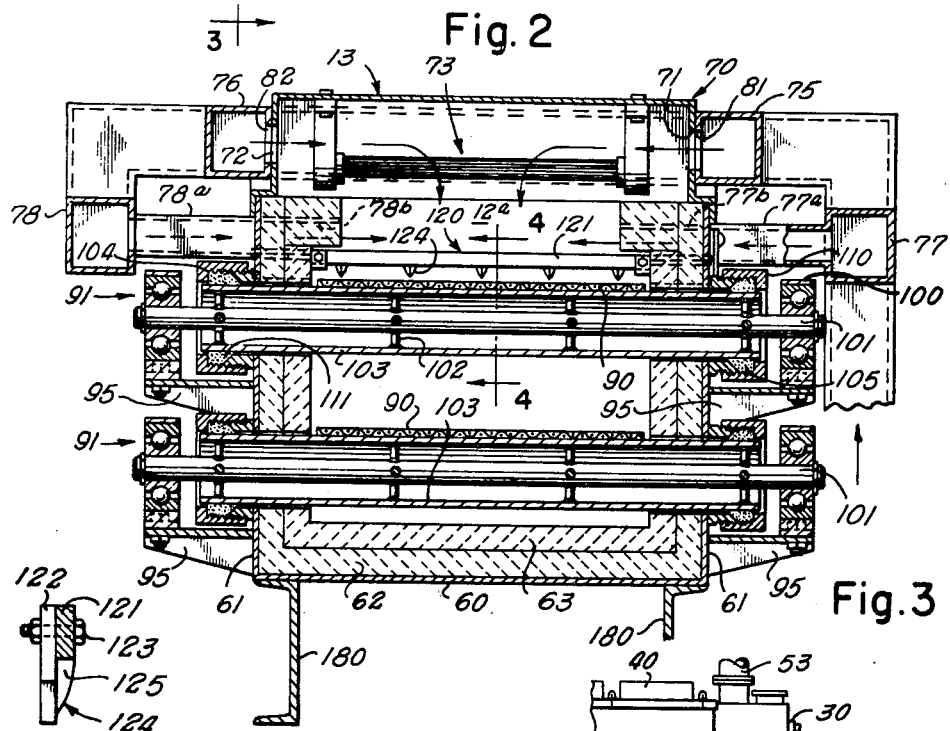
Fig. 3
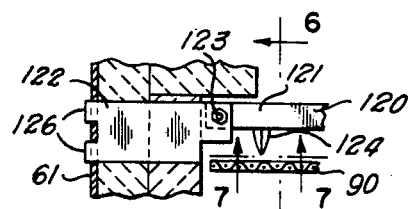
Fig. 5
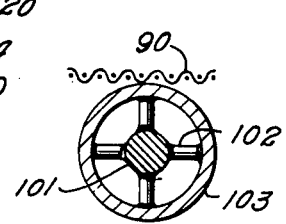
Fig. 4
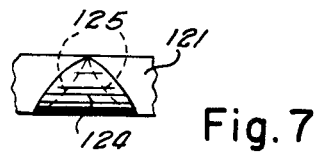
Fig. 7
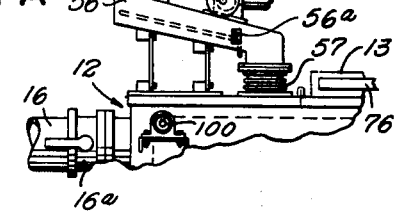
Fig. 1-A

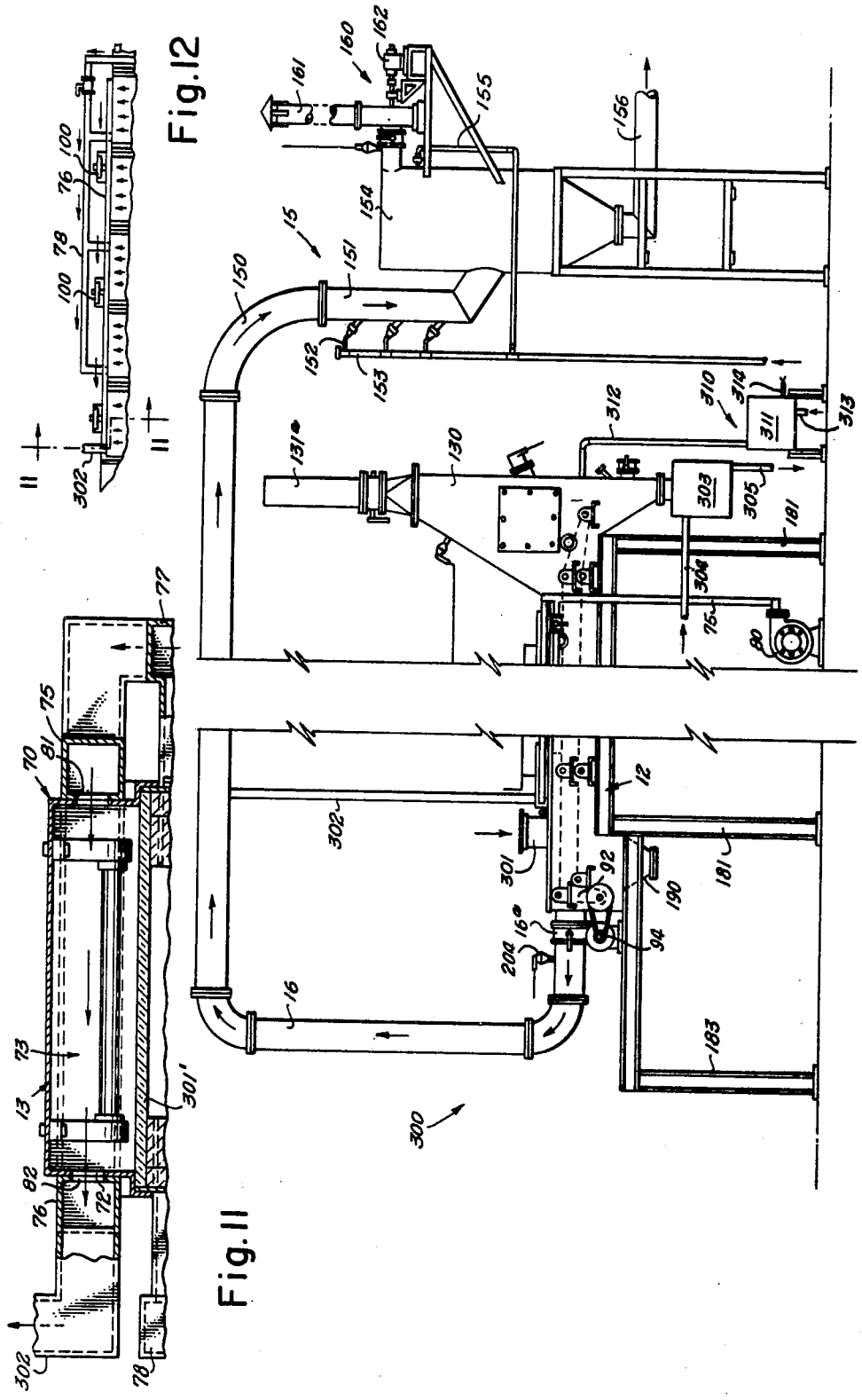

METHOD OF PROCESSING ACTIVATED CARBON

This is a division of application Ser. No. 627,651, filed Oct. 31, 1975, which issued on Sept. 27, 1977 as U.S. Pat. No. 4,050,900, which is a continuation of application Ser. No. 423,398, filed Dec. 10, 1973, now abandoned, which was a continuation of application Ser. No. 173,803, filed Aug. 23, 1971, abandoned, which was a continuation-in-part application of Ser. No. 38,936, filed May 20, 1970, which issued on Mar. 14, 1972 as U.S. Pat. No. 3,648,630.

This invention relates to controlled combustion of materials and more particularly relates to both method and apparatus for incineration of sewage sludge and similar refuse and the reactivation and regeneration of activated carbon particles.

Problems in the handling, treatment, and disposal of refuse are becoming increasingly acute. Refuse of particular concern with respect to the present invention includes sewage sludge, industrial waste of various kinds, and other waste products which require some form of treatment and disposal such as cattle feedlot waste produced in substantial volumes in large feedlot operations which are especially prevalent in certain areas of the country now. The sewage sludge is that form of a semi-solid slurry remaining after certain treatment processes of municipal and industrial sewage. In some instances, at the present time, such refuse is being disposed of by using it as a fertilizer or burying it in earth excavations, though suitable land for such disposal is becoming increasingly difficult as also are the transportation and sanitation problems inherent in the burying approach. Other forms of disposing of such refuse have included burning it in incinerators which, however, have generally been large units functioning at a low efficiency and involving substantial capital outlays. Thus, it is becoming increasingly urgent that more practical, efficient, and compact systems and methods be devised for the handling of the increasing volumes of the various types of refuse which are disposable by the method and apparatus of the invention.

In sewage treatment, water purification, sugar refining, and numerous other industrial and municipal treating and production processes activated carbon in either granular or powder form is used as an adsorbant. Such carbon is a porous material having large numbers of voids which provide substantial surface area to which matter being removed from the water or other fluid being processed attach themselves. Such carbon particles after becoming saturated with various contaminants must be either discarded or reactivated by the removal of the contaminants from the many surfaces on the carbon and defining the voids in the particles to prepare the carbon for re-use. Also, during the manufacture of activated carbon, certain bonding agents are used which require removal before the particles are ready for use in the various treating and purifying processes referred to. In the original activation and also in the reactivation of such carbon particles, it is necessary that the various foreign matter including the contaminants and bonding agents adhering to the surfaces defining the particle voids be burned off or volitized to free the active surface areas for adsorption. Furnaces of conventional design have been used for the purposes of activating and reactivating carbon particles though such furnaces are expensive, operate at low efficiency, and are difficult to control to the degree required for optimum carbon treatment which comprises removing the unwanted material from the carbon voids while leaving the carbon particles themselves undamaged for future use. Poor control over the burning or oxidation process usually burns the carbon particles themselves.

It is, thus, a principal object of the present invention to provide new and improved methods and apparatus for processing materials by incineration including the burning of waste products and the cleaning by incineration of activated carbon particles for both initial activation and reactivation of the carbon.

In accordance with the invention, an incineration method and apparatus is provided for processing materials by incineration including supporting the material in an enclosure, directing infrared radiation on the material, and controlling the atmosphere within the enclosure around the material to achieve efficient complete burning of the materials desired to be eliminated. The system of the invention includes a long, narrow combustion chamber housing, a belt-type conveyor for continuous movement and incineration of material in the combustion chamber, and heating units comprising infrared lamps supported above the combustion chamber to provide a highly concentrated intense heat along the length of the chamber on the material on the conveyor belt so that a concentrated, accurately controllable source of heat is directed to the material for maximum heat with a minimum loss. The combustion chamber is adapted to be maintained at a slight vacuum to minimize the escape of objectionable fumes during the combustion process. The form of the system for sewage sludge, cattle waste, and similar refuse treatment includes a feed conveyor, a grinding mill, and infrared heat means for obtaining a degree of dehydration and fragmentation of the waste as it is fed into the combustion chamber on the conveyor belt. In this form of the system air flow passages are provided directly into the combustion chamber and also along the infrared heat lamps into the combustion chamber for cooling the lamps and supplementing the primary source of cooling and oxygen supplying air to the combustion chamber. In the form of the system used for carbon activation and reactivation, the carbon is fed directly into the system onto the conveyor belt. In this particular form of the system, quartz panels are positioned between the combustion chamber and the infrared lamps to isolate the cooling air to the infrared lamps from the combustion chamber for providing more accurate control over the atmosphere in the chamber. Additionally, in this form of the system steam supply means is provided into the discharge end of the combustion chamber to permit steam to flow along with the combustion gases so that either oxydizing air, steam, or a mixture of air and steam may be used in the combustion chamber during the activation or reactivation of carbon particles depending upon the character of the particular particles being treated. In both forms of the system, flow passage means are provided for counterflow of combustion gases produced by the burning of material on the conveyor belt to take advantage of the heat generated during burning. Also, in both forms of the system, means are provided for handling the processed materials discharged from the combustion chamber and the gases, which are scrubbed and otherwise treated to properly prepare them for venting to the atmosphere.

In applying the system and method of the invention to sewage sludge treatment, the sludge is fed in the form of a very thick slurry into the feed assembly in which the sludge moves through the feed conveyor under intense infrared heat initially driving off part of the moisture and somewhat exploding the matter to fragment it. The material is then fed through a grinding mill to a vibrating feed conveyor which deposits the ground particles on the input end of the feed conveyor at a first end of the combustion chamber. The particles of refuse drop into the combustion chamber onto a conveyor belt along which they are subjected to intense, concentrated heat from the infrared lamps above the combustion chamber. The combustion chamber is maintained under a slight vacuum and the flow of combustion gases is controlled to cause counterflow of the gases along the combustion chamber against the direction of movement of the belt toward the inlet end providing preliminary heating of the material for early moisture removal and additionally inhancing the heat from the infrared lamps so that the amount of power fed to the lamps is minimized. Temperature sensing devices along the combustion chamber measure the temperature and control the power to the lamps in addition to providing data for control of the atmosphere in the combustion chamber. Refuse is continuously rapidly reduced on the conveyor to a low volume ash which is removed from the discharge end of the combustion chamber. The gases are scrubbed, fly ash removal, and they are cooled and vented to the atmosphere. The ash discharged from the conveyor belt is moved by a bucket type conveyor to a suitable handling system. The continuous, highly efficient, compact system allows high volumes of refuse to be rapidly reduced to minimum quantities of non-objectionable, sterilized organics which are much more readily disposed of than present forms of sewage sludge waste.

In the application of the invention to carbon activation and reactivation, the carbon particles are fed directly into the combustion chamber onto the conveyor belt without the prior heating and fragmentation used in the sewage treatment approach. The carbon moves along the belt, the chamber is maintained under a vacuum, and the combustion gases are counterflowed along the chamber for pre-heating and supplementing the heat supplied from the infrared lamps. Air is flowed along the infrared lamp fixtures isolated from the combustion chamber for cooling the fixtures without affecting the atmosphere in the combustion chamber. The atmosphere in the combustion chamber is controlled by admission of either oxidizing air or steam or a mixture of air and steam to control the incineration of the bonding agents and/or othr foreign matter to be removed from the voids of carbon particles being initially activated and the contaminants and other foreign matter to be removed from carbon particles being regenerated with essentially complete removal of such matter without burning the carbon particles themselves. As in the case of the application of the system and method to sewage sludge, the treated material is discharged at the end of the conveyor belt for further processing and handling while the combustion gases counterflow along the combustion chamber discharging from the chamber at the input end of the conveyor belt passing to gas scrubbing and fly ash removing equipment for properly preparing the gases to be discharged to the atmosphere.

A more thorough understanding of the method and apparatus of the invention along with its objects and advantages will be had from the following description of preferred embodiments of the invention taken in conjunction with the accompanying drawings wherein:

FIG. 1 is a side view in elevation, partially schematic and broken away in section, of a preferred form of incineration system embodying the invention for use in processing sewage sludge and similar refuse material;

FIG. 1-A is an enlarged fragmentary view in elevation showing the feed assembly of the system including the feed conveyor, grinder, and related equipment connected into the input end of the combustion chamber for supplying of materials to be processed into the system;

FIG. 2 is an enlarged fragmentary side view in elevation and section of a portion of the combustion chamber and housing partly broken away to show the infrared heating units, conveyor belt, air supply systems, and related structure;

FIG. 3 is an enlarged view in section along the line 3—3 of FIG. 1 illustrating one of the infrared heating units and a pair of the conveyor belt supporting rollers;

FIG. 4 is a further enlarged view in section along the line 4—4 of FIG. 3 showing a fragment of the conveyor belt and one of the belt supporting rollers;

FIG. 5 is an enlarged fragmentary view in section and elevation illustrating a portion of one of the sludge rotation bars;

FIG. 6 is an enlarged view in section and elevation along the line 6—6 of FIG. 5 showing the mounting structure of the rotation bar and one of the teeth on the bar;

FIG. 7 is a bottom view in elevation taken generally along the line 7—7 of FIG. 5 showing a portion of the rotation bar with one of the teeth;

FIG. 8 is a view in section along the line 8—8 of FIG. 1 showing the feed screw and an infrared heating unit supported above the screw for initial fragmentation and moisture removal of the sewage sludge and similar material;

FIG. 9 is a fragmentary top view in elevation illustrating the cooling and combustion air supply system for supplying cooling air to the infrared heating units and combustion supporting air to the combustion chamber;

FIG. 10 is a broken side view in elevation of a modified form of the incinerator embodying the invention for use in activating and/or reactivating activated carbon particles;

FIG. 11 is an enlarged fragmentary view in section taken generally along the line 11—11 of FIG. 12 showing a modification of the combustion chamber and air flow system for supplying cooling air isolated from the combustion chamber for cooling the infrared lamp units in the system of FIG. 10;

FIG. 12 is a fragmentary top plan view of the combustion chamber with the air flow systems modified to the form of the apparatus shown in FIG. 10.

Figure 1:
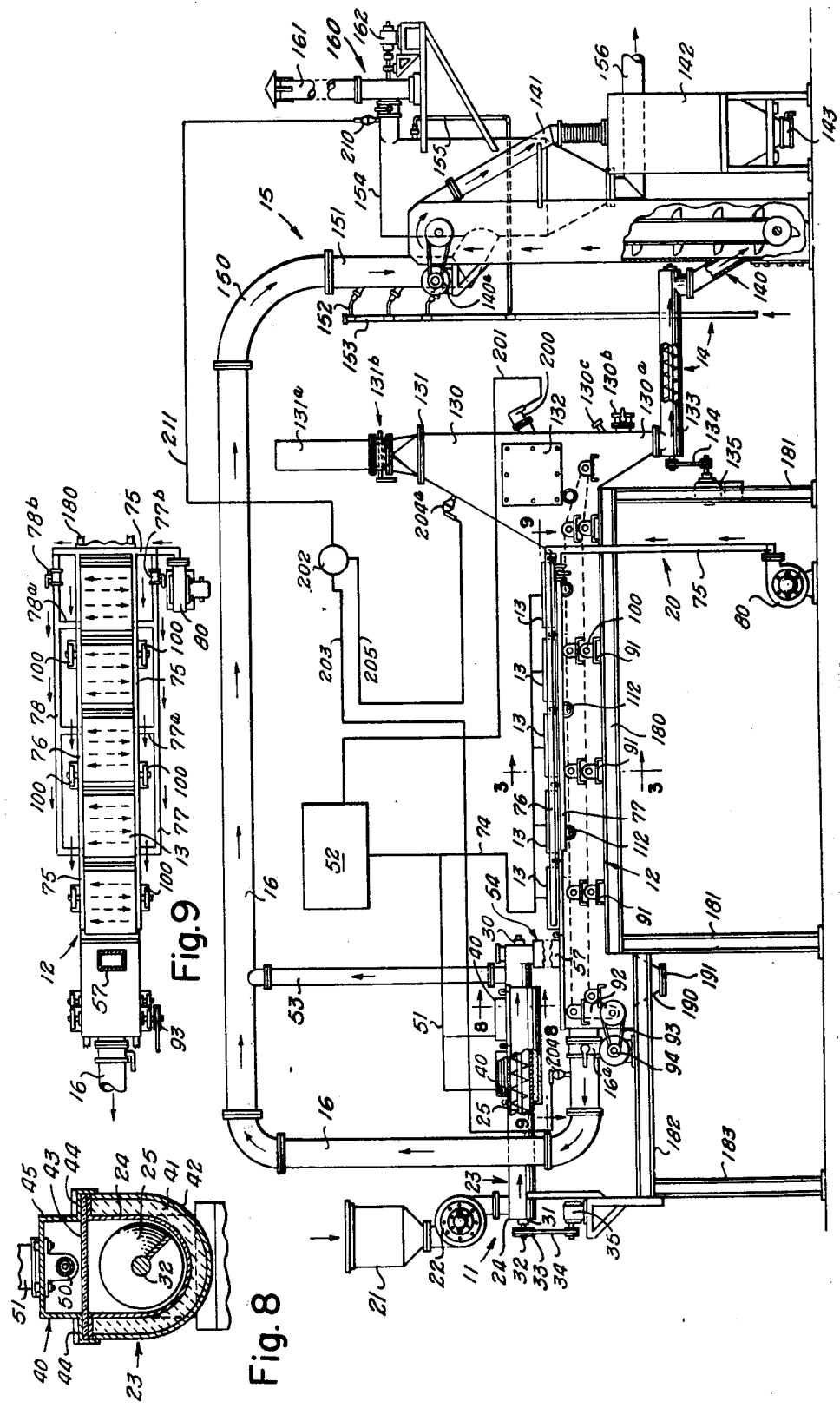

Referring to the drawings, a refuse incinerator 10 for processing sewage sludge and the like includes feed apparatus 11, an elongated conduit-like housing 12 defining a combustion chamber 12a, infrared heat units 13, an ash removal system 14, a gas scrubber 15, a combustion gas backflow discharge 16, and a cooling and combustion air system 20. Refuse to be treated is fed in through the feed apparatus 11 which continuously supplies the combustion chamber with refuse which has been fragmented by intense infrared heat and grinding. Within the combustion chamber the fragmented refuse is moved continuously on a conveyor belt beneath the infrared units supplying intense infrared heat which in combination with the heat generated by the actual combustion of the refuse effects essentially complete reduction by combustion of the refuse within the combustion chamber. At the discharge end of the conveyor belt the ash residue is deposited into the system 14, while the gaseous products of combustion backflow along the burning material on the belt in the combustion chamber to the combustion gas discharge 16. Combustion air entering the system around the infrared heat units is pre-heated by the lamps. In the scrubber the exhaust gases from the combustion chamber are cooled and vented, and solid particles carried over with the gases are removed. The combustion chamber is operated under a slight vacuum to prevent noxious fumes from escaping from the chamber during the combustion process.

The principal application of the incinerator is the treatment of sewage sludge which is the semi-solid product of a wastewater treatment plant. A typical charge of such sludge may comprise 20% solids with the remaining 80% being liquid. In the 20% solids 75% may be volatile and thus combustible in the present system. Thus, of the original total quantity of the sewage sludge, the 80% liquids may be removed by vaporization. Combustion then eliminates 75% of the remaining 20% solids so that of the initial total Weight of sludge only 5% may remain in the form of an ash which requires further disposition.

The sludge feed apparatus 11 includes a hopper-like surge tank 21 into which the sludge is fed from a supply source, not shown. The surge tank is mounted on a feed pump 22 which discharges to a screw conveyor 23 in an elongated housing 24 in which a feed screw 25 is rotably supported between flange mounted bearings 30 and 31 secured at opposite ends of the housing. One end of a shaft 32 supporting the feed screw extends from the bearing 31 and supports a pulley 33 driven by a belt 34 from a motor 35.

A particularly uniqe feature of the feed apparatus 11 is the fragmentation of the sludge by intense heat application from a pair of infrared heat units 40 mounted on the feed screw housing toward the discharge end thereof. Referring particularly to FIG. 8, the section of the feed screw above which the heat units are mounted is insulated by a layer of moldable refractory 41 extending along the sides and bottom of the housing 24 a slightly greater distance than the combined lengths of the two units 40. The refractory layer is covered by an outer housing shell 42. As particularly evident in FIG. 8, the insulated portion of the feed screw housing 24 is U-shaped in cross-section and open at the top the length of the heat units. The top of the insulated portion is covered by a quartz pane 43 which provides a protective window or lens between the feed screw compartment and the heat unit. The quartz pane rests on the top edges of the feed screw housing clamped in place by flanges 44 connected with the heater unit housing 45 in which are suspended infrared heat lamps 50. The lamps 50 are suitable infrared lamps capable of rapidly raising the temperature to a temperature of about 2500° F. of the sludge as it is moved by the feed screw beneath the heat unit. The quartz pane 43 effectively shields the lamps from the dirt and moisture of the sludge while permitting the full intensity of the heat units to be directed on the sludge for fragmentation and moisture removal.

The lamps 50 are connected by conductors 51 leading to a control panel 52 for supplying electric power to and controlling the intensity of the lamps.

Downstream from the heater units the feed screw housing 24 is connected with a vertical conduit 53 coupled at an upper end into the combustion gas backflow conduit system 16 to carry off vapors generated during the sludge fragmentation step in the housing by the lamps 50. As shown in FIG. 1-A, the feed screw conveyor 23 discharges downwardly into a hammermill-type grinder 54 which reduces the sizes of the sludge particles to a range not exceeding about ⅛ to ¾ of an inch in diameter. The grinder may be any suitable standard hammermill adapted to produce the particle size desired. The grinder is connected with a flexible coupling 55 secured into the upper end of a sloping vibrating feed conveyor 56 which discharges into the input end of the combustion chamber housing 12 on the conveyor belt in the housing. The feed conveyor 56 is any suitable standard vibrating conveyor such as one having a solenoid-actuated feed table. The feed table of the conveyor discharges along an adjustable weir 56a supported above the discharge end of the table for distributing and adjusting the height of the body of ground sludge particles on the feed table to provide an even feed to the conveyor belt in the combustion chamber. A flexible duct 57 is connected between the discharge end of the vibrating conveyor and the top of the housing 12.

The combustion chamber 12a defined by the elongated housing 12 shown in FIG. 3 is generally rectangular in cross-section. The housing has a bottom panel 60 connected with vertical, spaced side panels 61, both formed of suitable metal plate. Within the side and bottom panels the combustion chamber is lined with a double layer of refractory comprising an outer insulating refractory layer 62 and an inner refractory layer 63 of a low erosion castable type refractory. The outer layer of insulation 62 must provide a major portion of the needed heat insulation qualities and is formed of a suitable insulating refractory which is not, however, capable of standing up under the severe stress conditions imposed by the drastic temperature changes inherent in direct exposure to the heat within the combustion chamber. The inner layer of insulation 63 is formed of a suitable refractory capable of performing under severe temperature changing conditions. The absolute insulating qualities of the inner layer are substantially less than those of materials which will suffice for the outer layer of insulation. The top of the housing 12, both upstream and downstream of the heater units 13, is of the same general construction as the sides and bottom as shown in FIG. 3. The opposite side walls of the housings 70 along the heat units have air inlet openings 71 and 72 for lamp cooling and combustion air. The end seals of the lamp units particularly need cooling, and the heat absorbed by the air provides preheating for its combustion function as it flows downwardly into the combustion chamber.

A plurality of transverse infrared heater lamps 73 are spaced along the length of the combustion chamber within the housings 70 supported from the roof panels of the housings. The infrared lamps are of a suitable design to supply heat at a temperature of about 1200° F. to 1700° F. to supplement the heat generated by the combustion of the sludge within the chamber. Electric power is supplied to the infrared lamps through a lead 74 from the control panel 52. Cooling air for the heater unit lamps enters through supply ducts 75 and 76 connected with an air pump or blower 80. Horizontal portions of the cooling ducts 75 and 76 extend the length of the heater units 13, are secured along opposite side walls of the heater unit housings 70, and are provided with outlet openings 81 and 82 which register, respectively, with the openings 71 and 82 in the heater housings so that air supplied from the pump 80 is distributed laterally inwardly across each of the housings for cooling the lamps within the housings.

Another pair of combustion air input ducts 77 and 78 are connected with the blower 80, as shown in FIG. 9, to provide a supplementary or secondary supply of combustion air to the combustion chamber. The ducts 77 and 78 including valves 77b and 78b, respectively, are disposed outwardly of and below the ducts 75 and 76 and are connected at spaced intervals into the combustion chamber by short branch portions 77a and 78a, respectively, in the ducts 77 and 78. The branch duct portions 78a communicate with ports 78b formed through the side wall and ceramic liners of the combustion chamber housing while, similarly, the branch duct portions 77a communicate with ports 77b formed through the other side wall and ceramic liner portions of the combustion chamber housing. Supplementary combustion air thus may be pumped through the ducts 77 and 78 into the combustion chamber below the infrared lamps. If desired, this supplementary combustion air may be supplied from and controlled separately from another blower, not shown, so that, if needed, the air may be used for tempering purposes to aid in temperature control.

The sludge is moved along the combustion chamber on a conveyor belt 90 supported on a plurality of spaced roller units 91 for moving the sludge from the discharge 52 of the supply system to the scrubber and ash disposal end of the combustion chamber. The conveyor belt is constructed of a suitable chain linkage capable of continuous operation at extremely high temperatures in the range of 1500° F. and higher. In the particular conveyor system shown, a roller unit is disposed at opposite ends of the combustion chamber with three pairs of upper and lower roller units spaced along the length of the combustion chamber between the end rollers for supporting the continuous conveyor belt. The belt runs above both the upper and the lower rollers and around the opposite end rollers. The roller unit at the driven end of the belt is connected with a gear unit 92 powered by a belt 93 from a motor 94. The gear box arrangement includes means, not shown, for adjusting the tension in the belt.

Referring particularly to FIG. 3, each of the roller units 91 is supported on side brackets 95 secured to the side panels 61 on opposite sides of the combustion chamber housing. Bearing units 100 are bolted on the brackets 95 for supporting a roller shaft 101. Each of the roller shafts has spaced along its length sets of four radial spokes 102 which support a cylindrical roller 103. The opposite end portions of the rollers are disposed through stuffing boxes 104 formed by an annular flange 105 secured on the housing side panel and threaded into a cap 110. Asbestos rope 111 is confined in a ring within the cap against the outer end of the flange around the roller for sealing against heat losses from within the combustion chamber along the outer surface of each of the rollers. The opposite ends of the rollers are open to the atmosphere so that air may circulate throughout the length of each of the rollers along the annular space defined within the roller around the roller shaft 101.

Observation ports 112 having removable covers 113 for visual inspection of the interior of the combustion chamber are formed along the length of the side panels of the housing.

Spaced along the combustion chamber over the top material supporting portion of the conveyor belt 90 are turning bar units 120 which stir up, turn, and generally agitate and mix the sludge being incinerated on the belt to better expose it to the combustion process. Each turning bar unit includes a cross bar 121 mounted at each end on a bracket 122 by bolts 123, FIGS. 5 and 6. The brackets are set through the two layers of refractory lining with cleats 126 projecting through the side wall 61 of the combustion chamber housing. A plurality of plow-like teeth 124 are spaced along the length of each bar so that the tip ends of the teeth are closely spaced from the top surface of the conveyor belt 90. The teeth 124 each has concave turning faces 125 which enable the spaced teeth to plow the sludge on the top face of the conveyor belt in such a manner that it is thoroughly turned as it moves along the length of the belt within the combustion chamber. Several of the turning bar units are placed along the length of the belt with the teeth being so positioned that all of the sludge is turned as it moves along the length of the belt. The tooth spacing and positions on the several turning bars are varied to insure maximum sludge agitation by the time the sludge has moved past all of the bars.

The discharge end of the combustion chamber is connected with a housing 130 which is secured at its upper end by a flanged coupling 131 to an exhaust stack 131a having a damper valve 131b. A removable inspection door 132 is secured in the near side panel of the housing 130 as shown in FIG. 1. A lower hopper portion 130a of the housing connects directly into the feed end of a screw conveyor 133 driven by a belt 134 from a motor 135. The screw conveyor discharges downwardly to a bucket elevator unit 140 driven by a motor 140a. The discharge of the elevator is connected through a conduit 141 into a hopper-type storage tank 142 which is unloadable through a bottom door 143 for removal of the ash.

The combustion backflow discharge 16 connects at one end into the input end of the housing 12 through a valve 16a. The other end of the discharge 16 connects with an elbow conduit 150 on the scrubber. The elbow 150 opens into a spray section 151 having a plurality of vertically spaced sprays 152 from a pipe 153 leading to a water supply, not shown. The spray section discharges to a scrubber tank 154 of suitable standard design supplied with water through a line 155. Gas from the scrubber is discharged to the atmosphere through a stack 161 by an exhaust fan 160, driven by a motor 162.

The combustion chamber housing 12 is supported on a pair of spaced parallel channels 180 mounted on legs 181. At a lower level the motor 94 and the related driving mechanism at the inlet end of the combustion chamber housing are mounted on channels 182 supported on one pair of the legs 181 and a spaced pair of similar legs 183. The inlet end of the combustion chamber has a hopper section 190 having a cleanout door 191 for removal of ash and miscellaneous debris collecting at the inlet end of the chamber.

The control panel 52 is connected with the heater units 40 in the supply system 11, the heater units 13 of the combustion chamber, and with temperature sensing elements for determining the temperature of exhaust gases and supply air and the like to provide proper control of the incineration process. A temperature sensing element 200 is supported in the housing 130 to read the temperature in the combustion chamber at the discharge end of the conveyor belt. The element 200 is connected by a lead 201 to the control panel. A multiple pen recorder 202 is connected by a lead 203 to a temperature sensor 204 in the backflow conduit 16 from the combustion chamber. Another temperature sensor 204a is located in the upper portion of the housing 130 connected by lead 205 to the recorded. A further temperature sensor 210 at the discharge from the scrubber tank 154 is connected by a lead 211 to the recorder.

A manually controlled valve 130b for controlling communication between the atmosphere and the base end 130a of the housing 130 is connected into the lower discharge portion of the housing above the screw conveyor 133. A capped thermoweld 130c is secured in the discharge portion of the housing for insertion of a temperature sensor as desired. The functions of the recorded 202 sensing and recording critical operation temperature and the control panel 52 may be fully automated, fully manual, or arranged in various degrees between manual and automatic for controlling the operation of the incinerator to achieve maximum efficiency. While the principal control of the panel 52 in the arrangement of the system illustrated is the maintenance of a desired temperature at the heater units 13 and 40, other functions may be ascribed to the control panel as desired, depending upon the level of automation to be achieved in the system. For example, the backflow control valve 16a, the tempering air valves 77b and 86a for admission of air to aid in controlling the temperature combustion, and other controllable functions, such as the supply of cooling and combustion supporting air from the system 20, may be interconnected with the control panel as desired and required to fully adjust all of the variables existent within the system for optimum operation.

In the operation of the incinerator, the material to be processed which may be sludge from either a municipal or industrial wastewater treatment plant, is fed at a continuous rate, commensurate with the capacity of the incinerator, into the feed assembly 11 through the surge tank 21. The sludge is in the nature of a mud-like slurry combining solids and liquids in varying percentages depending upon the processes of the treatment plants. The solids may comprise a wide range of the total volume of the sludge. The sludge is deposited in the surge tank 21 from which it is delivered by the pump 22 into the screw conveyor 23 where the feed screw 25 moves the material along the conveyor. As the sludge is driven along the conveyor housing by the feed screw, it passes along the portion of the conveyor heated by the infrared lamps 50. The intense heat of the lamps, which may be on the order of about 2500° F., is directed through the quartz panels 43 to the sludge being moved by the feed screw. The intense, violent change to which the sludge is subjected in moving from the unheated input end of the feed conveyor into the extremely high temperature imposed on the unit by the lamps 50 instantaneously vaporizes a substantial portion of the moisture in the sludge with the explosion-like effect of the vaporization breaking the sludge down into particle sizes which are much more readily incinerated in the combustion chamber. The fundamental purpose of the heat from the infrared lamps along the feed screw is not moisture removal but rather fragmentation of the sludge, which most generally is tightly bonded together by the interlacing of hair and similar fibrous particles when it enters the conveyor. The zone along the conveyor at which the heat is directed will attain temperatures on the order of 1800° F. to 2500° F., which is necessary to produce the instantaneous explosive-like vaporization for severing the hair particles to break the bonds holding the especially larger pieces of sludge together. Additionally, there may be a minor degree of combustion occurring, and certainly there will be some melting of the hair and other fibrous particles. The fragmented sludge is discharged by the feed screw to the hammermill 54 which grinds it to a generally uniform size depositing it on the vibrating unit 56. The unit 56 vibrates the sludge particles along the table surface feeding it under the weir 56a which levels and spreads the particles to a uniform depth. The sludge particles are discharged through the duct 57 to the feed end of the conveyor belt 90 in the combustion chamber. The moisture and other gaseous byproducts of the fragmentation heat at the discharge end of the feed conveyor are exhausted from the conveyor housing through the flow conductor 53 through which it flows to the conduit system 16.

The conveyor belt 90 is driven by the motor 94 at a rate calculated to permit complete combustion of the sludge deposited on the belt between the point of deposit and the discharge end of the belt above the ash removal system at the base of the stack 130. Obviously, there are a number of variables which will determine the rate at which the conveyor belt is driven. For example, the physical nature of the sludge including the percentage of moisture and the combustible solids affects the time required to fully drive the moisture from the sludge and completely incinerate the combustible portion of the solids. The actual process of incineration of the sludge as it is moved along by the conveyor belt is accomplished by the combination of the heat supplied by the infrared lamps in the heat units 13 and the heat generated by the combustion of the volatile contents of the sludge.

Obviously, in starting up the incinerator, no products of combustion, and thus by-product heat for recirculation, are initially available, and therefore the first heat applied to the sludge within the combustion chamber is supplied from the heat units 13 toward the inlet end of the chamber. The sludge is heated along the combustion chamber to a temperature in the range of 1200° F. to 1700° F. with the moisture in the sludge being initially driven off followed by incineration of the volatile portions of the sludge. The gaseous vapors from the liquid in the sludge and the combustion gases from the burning of the liquid particles counterflow along the combustion chamber and discharge through the conduit system 16 to the scrubber 15. A forced draft is provided in a counterflow direction along the length of the combustion chamber by the combined force of fresh combustion supporting air supplied from the system 20 and the counterflowing gases which are drawn along the conduit system 16 by the water sprays 152 and the condensation effected in the scrubber. The combustion and cooling air is introduced into the system by the blower 80 which discharges through the supply ducts 75, 76, 77, and 78 into each of the heater units 13 and into the sides of the combustion chamber as shown in FIG. 3. The air flows laterally inwardly along the heater unit housings as designated by the flow direction indicator arrows in FIGS. 3 and 9. Within the heater unit housings the air from the ducts 75 and 76 functions to cool the infrared lamps and the lamp end seals also preheating the air. The heated air flows downwardly into the combustion chamber mixing with the air from the ducts 77 and 78. The heated air aids in combustion due to both its heat value and its oxygen content. Additionally, the counterflowing combustion gases add to the heat supplied to support the burning of the sludge. These combined heat sources reduce the heat required of the infrared lamps.

During the initiation stage of the combustion process the conveyor belt is driven at a very slow rate as compared with the belt rate when the incinerator is operating at its full capability for a given sludge. Obviously, it will take longer initially to heat up the entire system and start moisture drive-off and combustion than to achieve complete combustion after the system is fully operative. When combustion is fully established, the process is controlled to maintain an approximate temperature of 1700° F. at the discharge end of the conveyor belt as sensed by the temperature sensing means 200. The desired temperature may be maintained by control of several variables including the power to the infrared lamps and the admission of tempering air to the conduit through the system 20. Once the combustion process is fully established in the combustion chamber, the backflow of the combustion gases provides a substantial amount of heat which, when combined with the heat in the fresh combustion air entering through the ducts 75–78, provides a major portion of the heat necessary to sustain combustion of the volatile solids of the sludge along the conveyor belt. Once full capacity combustion is established in the chamber, a minimum amount of supplemental heat from the infrared lamps will be necessary.

As the sludge deposited from the feed conveyor moves along the conveyor belt, the teeth 124 on the turning bars break up the sludge which under the intense heat of the combustion chamber tends to crust as it moves along beneath the infrared lamps. The placement of the turning teeth of the several turning bars at different locations along the length of the bars insures maximum contact of the sludge on the belt by the teeth to agitate and improve the exposure of the sludge to the heat. The flow rate and pressures of the recirculated combustion gases, the air supplied by the system 20, and the draft induced by the scrubber 15 are manipulated to maintain the combustion chamber operating under a vacuum relative to the surrounding or ambient atmosphere to prevent noxious fumes from escaping from the chamber during the combustion of the sludge solids.

As the sludge reaches the discharge end of the conveyor belt, all of the volatile solids have been incinerated with the small quantity of ash remaining being deposited downwardly into the lower hopper portion 130a of the stack. The ash falls into the discharge conveyor 133 in which a feed screw moves the ash to the elevator 140 in which it is lifted and deposited downwardly through the conduit 141 into the storage tank 142. The ash is removable from the storage tank through the lower door 143.

The counterflowing combustion gases drawn into the conduit 16 from the feed end of the combustion chamber flow through the conduit 150 to the spray portion 151 of the scrubber 15. Water from the nozzles 152 is injected into the combustion gases for cooling the gases and separating the solid particles or fly ash carried over by the gases from the combustion chamber. A portion of the water and fly ash are discharged from the conduit 156 at the bottom of scrubber tank 154. The tank may include compartments for several passes of the combustion gases, during which additional water may be sprayed into the flowing gases for further cooling and fly ash separation. The cooled exhaust gases are discharged to the atmosphere through the exhause stack 161 by the exhause fan 160. Any portions of the sludge which drop through the belt at the inlet end of the combustion chamber may be cleaned out from time to time through the removable door 191 in the cleanout hopper section 190.

In the event of a failure or malfunction of components of the system relating to the conduit 16 and/or the combustion chamber, the valve 131b may be opened to exhaust to the atmosphere through the stack 131a.

The apparatus and method of the invention provide for highly efficient, continuous sludge incineration which permits the handling of a maximum quantity of sludge in a minimum of time and space. The use of the infrared heat, both in starting up the combustion process and for sustaining the process, is a highly efficient manner of supplying a maximum quantity of heat at a minimum cost and in equipment which is highly compact. Thus, the principal source of heat generated in the combustion chamber is derived from the burning of the volatile solids of the sludge with the necessary supplemental heat being supplied by the intense, compact, high temperature infrared lamps. Additionally, initial fragmenting of the sludge in preparation for the combustion process is also provided by the application of intense heat from infrared lamps.

While the incinerator and incineration method have been discussed in terms of the processing of the sewage sludge, it will be recognized that other forms of refuse may be processed by the same method in the apparatus. Particularly, for example, the sludge by-product of cattle feedlots in high density cattle feed operations presents a particularly difficult disposal problem, which is solvable in the same manner provided above for the sewage sludge. The high concentration of heat obtainable with infrared lamps substantially reduces normal heat losses inherent in present incinerators.

The incineration system 300 illustrated in FIGS. 10–12 is a modified form of the system shown in FIG. 1 adapted to initial activation and regeneration or reactivation of activated carbon particles by incineration. The system 300 has the essential characteristics and functions of the system 10 with a modified form of supply and discharge together with an altered air flow passage arrangement for the infrared cooling lamp air to especially adapt the system to the processing of activated carbon. The combustion chamber 12, the counterflow discharge system 16, the gas processing system 15, and other related apparatus are identical of that of the incinerator 10. In the incinerator 300, a process material supply line 301 is connected directly into the combustion chamber at the input end of the conveyor belt 90 for supplying the carbon to be processed directly into the combustion chamber onto the belt without the forms of pre-treatment used in the incinerator 10. FIG. 11 shows the structure for isolating cooling air for the lamps from the combustion chamber. The other features of the combustion chamber 12a and the housing 12 are shown in FIG. 3. Referring to FIG. 11, a quartz pane 301 for each of the cooling lamp housings is clamped between the cooling lamp housing across the top of the combustion chamber at the inner and outer ceramic linings of the chamber so that the interior of the lamp housings are each isolated from the combustion chamber. The air duct 76 is connected with a vertical discharge duct 302 leading to the counterflow discharge conduit system 16 so that cooling air for the lamps passes from the duct 75 directly across the lamp housings into the duct 76 and is then vented into the gas discharge system. The lamp cooling air is precluded from entry into the combustion chamber 12a by the quartz pane barriers 301. In all other respects the combustion chamber structure is unaltered from that of FIGS. 1 and 3. The isolation of the lamp cooling air from the chamber is particularly essential when treating activated carbon to minimize the amount of oxygen added to the combustion chamber so that precise control of the burning process in the chamber is maintained to prevent burning the carbon particles themselves after the contaminants have been incinerated.

At the discharge end of the combustion chamber, the system 300 includes a quench tank 303 provided with a water inlet 304 and an outlet 305 so that the carbon particles treated in the chamber are deposited from the conveyor belt directly into the quench tank and flow from the tank in the form of a slurry to suitable facilities, not shown, for final handling of the activated carbon particles, which is not within the scope of the present invention. A steam supply system 310 is connected to the discharge end of the combustion chamber for providing a supply of steam to the chamber to permit more precise control of the atmosphere in the chamber when treating carbon particles. A boiler 311 is provided with a steam outlet 312 to the chamber and a water supply line 313. A power conduit 314 leads to electric heating means, not shown, in the boiler to generate the desired steam for supply to the combustion chamber. In all other respects the structure of the incinerator at the housing 130, including the stack 131a and related apparatus, is unchanged from the system 10 shown in FIG. 1.

In the operation of the system 300 for either the initial activation of carbon particles or the regeneration or reactivation of such particles, the basic objective is the elimination of all foreign material from the surfaces of the carbon with exteriorly and interiorly of the carbon so that maximum carbon particle surface is available for adsorption when the carbon is used in wastewater treatment, water purification, and many other uses to which activated carbon is put. The carbon particles may range in size from on the order of as large as ⅛ of an inch in diameter, or the same order of magnitude of the major dimension in irregular particles, down to particles which would normally be considered as a powder. The particles have many void spaces in which contaminants attach themselves to the carbon surfaces during the treatment processes using the carbon. Also, when initially manufactured, the voids may contain bonding agents and particles may be bonded together by such agents which must be removed in order to initially activate the carbon for use. The carbon particles to be treated are introduced into the combustion chamber 12 onto the conveyor belt through the conduit 301. As the particles are deposited on the belt and move along the belt, they are heated by the infrared lamps, the atmosphere is adjusted to a slight vacuum, and counterflow of gases along the combustion chamber into the discharge system 16 is established. Air is supplied to cool the lamps from the duct 75 through the lamp housings into the discharge duct 76. The air is prevented from entering the combustion chamber by the quartz panes 301' which isolate the lamp housings from the combustion chamber. The air which may be required for oxidation in incineration of the carbon contaminants is supplied through the ducts 77 and 78 in the same manner as with the system 10.

An essential in the processing of activated carbon in the incinerator 300 is the control of the combustion chamber atmosphere to a condition which permits essentially complete incineration of the bonding agents and/or contaminants, as the case may be, with no incineration or at least minimum incineration of the carbon particles themselves. Depending upon the characteristics of the carbon particles being treated and the contaminants present in the particles, the atmosphere in the combustion chamber is controlled from over a range from straight air to pure steam and various mixtures of air and steam. The air is supplied into the sides of the combustion chamber as needed through the ducts 77 and 78 while the steam is supplied through the line 312 from the boiler 311. As the carbon is moved along the conveyor belt under the infrared lamps in the desired combustion chamber atmosphere, it is heated by the lamps to a temperature range from between about 1000° F. to about 1800° F. and is constantly turned or agitated by the teeth 124 on the turning bars 120. During the progress of the carbon from deposit on the conveyor belt to the end of the belt in the combustion chamber, the contaminants and/or bonding agents are essentially all burned from the carbon surfaces with the counterflow of the combustion gases enhancing the incineration reducing the amount of heat required to be supplied by the infrared lamps. The carbon particles are discharged from the end of the conveyor belt in the housing 130 into the quench tank 303 to quench any matter still burning. The particles and the water in the quench tank flow through the line 305 to facilitate for further handling of the particles in accordance with standard procedures not within the scope of the present invention.

The surfaces of the carbon particles are burned clean, thereby preparing them for first use in the case of initial activation, and restoring them in the regeneration process to essentially the same active area as available in original virgin carbon for use in the various treatment processes to which the carbon is applied. The removal of the foreign matter from the carbon particles is achieved with a lower loss of carbon than in any other presently available systems for the activation or reactivation of activated carbon. In addition to the highly efficient removal of foreign material by incineration from the carbon particles with a minimum of loss of the carbon particles themselves, the time required for treatment is substantially less than that necessary in presently available apparatus and methods. The capabilities of closely controlled temperatures far exceeds those in present apparatus, and the start-up time is substantially faster than in such apparatus. The greatly increased efficiency permits the use of electric power with the total power cost being substantially the same as in the use of natural gas. In presently known systems of carbon regeneration about 8000 BTU are required to regenerate each pound of carbon when using natural gas, while in contrast the present use of infrared lamps permits the regeneration of a pound of carbon with the use of only about 2000 BTU.

What is claimed and desired to be secured by Letters Patent is:

1. A method of thermal processing of active carbon particles for the purpose of removing material foreign to said carbon particles from internal and external surfaces of said particles comprising:

defining an elongated chamber having an inlet end and a discharge end, supporting an endless conveyor belt for horizontal movement within said chamber, moving said belt within said chamber such that an upper belt portion moves from said inlet end to said discharge end of said chamber and wherein a lower return belt portion moves from said discharge end to said inlet end, receiving active carbon particles from a source and discharging said active carbon particles on said upper belt portion in the region of said inlet end of said chamber, directing infrared rays from the upper portion of said chamber on the active carbon particles deposited on said upper belt portion as said belt moves said active carbon particles from said inlet end to said discharge end, said infrared rays being of sufficient magnitude to thermally gasify matter from said active carbon particles, maintaining at least a partial vacuum in said chamber, flowing gases produced by said gasifying of matter along said chamber in a direction parallel to the direction of movement of said belt for minimizing the required heat from said infrared rays, sensing the air temperature within said chamber above said conveyor belt, in response to the temperature sensed, controlling the temperature within said chamber in order to complete the thermal gasification of said active carbon particles, and discharging the processed active carbon particles from said belt at said discharge end of said chamber.

2. The method of claim 1 and further comprising: heating said active carbon particles within said chamber to a temperature range from between about 1,000° F. to about 1800° F.

3. The method of claim 1 and further comprising: controlling the atmosphere within said chamber according to predetermined criteria.

4. The method of claim 1 and further comprising: agitating said active carbon particles during their passage from said inlet end to said discharge end of said chamber.

5. The method of claim 1 and further comprising: applying electric power to an infrared heat source in order to generate said infrared rays, and varying the electricity applied to said infrared heat source in accordance with the temperature sensed within said chamber.

6. The method of claim 1 and further comprising: applying approximately 2,000 BTU of energy to heat each pound of said active carbon particles in order to thermally process said active carbon particles.

7. The method of claim 3 wherein the atmosphere is controlled by the introduction of air into said chamber.

8. The method of claim 3 wherein the atmosphere is controlled by the introduction of steam into said chamber.

9. The method of claim 3 wherein the atmosphere is controlled by the introduction of air and steam into said chamber.

* * * * *

UNITED STATES PATENT AND TRADEMARK OFFICE
CERTIFICATE OF CORRECTION

PATENT NO. : 4,204,979
DATED : May 27, 1980
INVENTOR(S) : Jim F. Hobbs et al.

It is certified that error appears in the above—identified patent and that said Letters Patent is hereby corrected as shown below:

Column 3, line 28, "removal" should read -- removed --.

line 52, "othr" should read -- other --.

Column 5, line 27, "Weight" should read -- weight --.

Column 10, line 52, "liquid" should read -- solid --.

Column 13, line 42, "with" should read -- both --.

Column 14, line 36, "facilitate" should read -- facilities --.

Signed and Sealed this

Fourteenth Day of October 1980

[SEAL]

Attest:

SIDNEY A. DIAMOND

Attesting Officer

Commissioner of Patents and Trademarks